(12) United States Patent
Takigawa et al.

(10) Patent No.: US 10,636,235 B2
(45) Date of Patent: Apr. 28, 2020

(54) VEHICLE WIRELESS COMMUNICATION FOR PERFORMING COMMUNICATION BETWEEN VEHICLE-MOUNTED DEVICE AND MOBILE DEVICE, IDENTIFICATION INFORMATION REGISTRATION METHOD

(71) Applicant: PANASONIC INTELLECTUAL PROPERTY MANAGEMENT CO., LTD., Osaka (JP)

(72) Inventors: Masami Takigawa, Kanagawa (JP); Genki Saito, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/360,795

(22) Filed: Mar. 21, 2019

(65) Prior Publication Data

US 2019/0295345 A1    Sep. 26, 2019

(30) Foreign Application Priority Data

Mar. 26, 2018 (JP) .................................. 2018-058929
Feb. 22, 2019 (JP) .................................. 2019-030415

(51) Int. Cl.
*B60R 25/00* (2013.01)
*G07C 9/00* (2020.01)
*B60R 25/24* (2013.01)

(52) U.S. Cl.
CPC ........ *G07C 9/00309* (2013.01); *B60R 25/241* (2013.01); *G07C 2009/00436* (2013.01); *G07C 2009/00468* (2013.01)

(58) Field of Classification Search
CPC ...... G07C 9/00309; G07C 2009/00436; G07C 2009/00468; B60R 25/241
See application file for complete search history.

(56) References Cited

U.S. PATENT DOCUMENTS

| | | | |
|---|---|---|---|
| 7,215,238 B2 * | 5/2007 | Buck .................. | G07C 9/00309 318/16 |
| 10,471,931 B2 * | 11/2019 | Naitou ............... | G07C 9/00309 |
| 2002/0024417 A1 * | 2/2002 | Morrison ................ | B60R 25/24 340/5.25 |
| 2008/0048828 A1 * | 2/2008 | Buccinna ................ | B60R 25/24 340/5.72 |
| 2013/0214900 A1 * | 8/2013 | Mitchell ............ | G07C 9/00309 340/5.61 |

(Continued)

FOREIGN PATENT DOCUMENTS

JP    2003-020835    1/2003

*Primary Examiner* — Munear T Akki
(74) *Attorney, Agent, or Firm* — Greenblum & Bernstein, P.L.C.

(57) ABSTRACT

A first mobile device can be mounted in a vehicle and includes an input unit and an output unit that can output an instruction instructing the vehicle to at least unlock the vehicle. The first mobile device is capable of wireless communication with a first on-board device and includes an operation unit. The first mobile device transmits a fourth signal having a first value of second identification information to the first on-board device. The first on-board device that has received the fourth signal changes the second identification information held in the first on-board device to the first value.

20 Claims, 8 Drawing Sheets

(56) References Cited

U.S. PATENT DOCUMENTS

2014/0342668 A1* 11/2014 Kyomitsu .......... G07C 9/00944
455/41.2
2016/0098870 A1* 4/2016 Bergerhoff ......... G07C 9/00007
340/5.61

* cited by examiner

1000

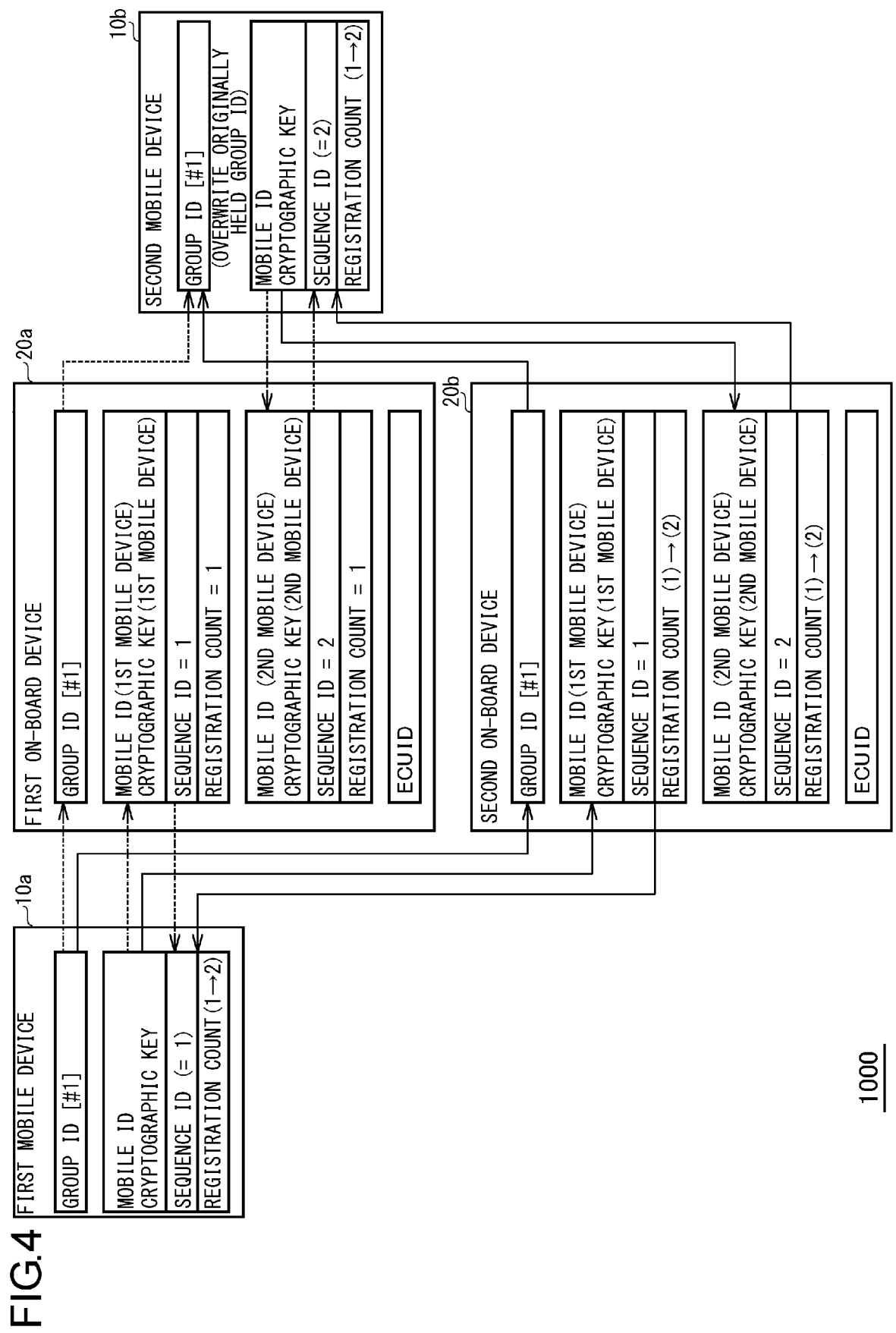

FIG. 5A

| WAKE PATTERN FOR REGISTRATION | COMMAND MOBILE DEVICE SEARCH |
|---|---|

FIG. 5B

| PRE-AMBLE | SE-QUENCE ID | GROUP ID | CRC |
|---|---|---|---|

FIG. 6A

| WAKE PATTERN FOR REGISTRATION | COMMAND INFORMATION REQUEST |
|---|---|

FIG. 6B

| PRE-AMBLE | MOBILE ID | CRYPTO-GRAPHIC KEY | REGISTRA-TION COUNT | CRC |
|---|---|---|---|---|

FIG. 7A

| WAKE PATTERN FOR REGISTRATION | COMMAND | SEQUENCE ID | GROUP ID | REGISTRATION COUNT |

FIG. 7B

| PRE-AMBLE | ACK | CRC |

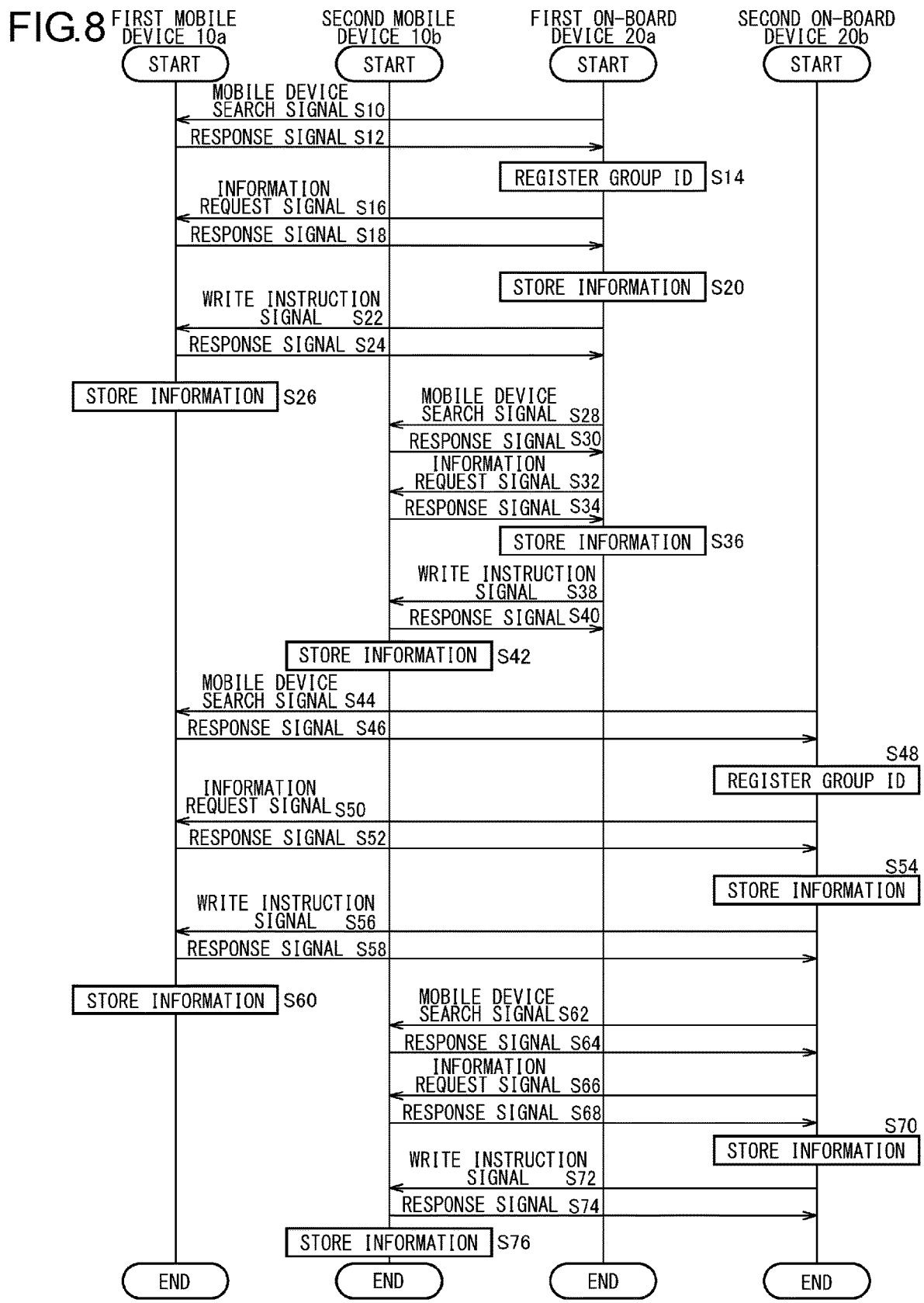

VEHICLE WIRELESS COMMUNICATION FOR PERFORMING COMMUNICATION BETWEEN VEHICLE-MOUNTED DEVICE AND MOBILE DEVICE, IDENTIFICATION INFORMATION REGISTRATION METHOD

BACKGROUND

1. Field

The present disclosure relates to registration techniques and relates, in particular, to a wireless communication system for a vehicle that executes communication between an on-board device mounted in a vehicle and a mobile device and to an identification information registration method.

2. Description of the Related Art

Wireless communication is executed to lock or unlock a vehicle door lock. An on-board device mounted in a vehicle transmits a request signal, and when a mobile device carried by the vehicle user transmits response data, the on-board device locks or unlocks the door lock. Prior to executing such processing, the mobile device is registered into the on-board device. In the registration operation, a vehicle identification (ID) uniquely assigned to the on-board device is written into the mobile device from the on-board device (see, for example, patent document 1).

Patent Document 1: JP2003-20835

When a vehicle ID unique to an on-board device is registered into a mobile device, one mobile device can be used for only one vehicle. Therefore, a user who owns a plurality of vehicles from an identical manufacturer may carry a plurality of mobile devices or may use a wrong mobile device for a given vehicle. Accordingly, there is a demand that door locks of a plurality of vehicles be controlled with a single mobile device.

SUMMARY

The present disclosure has been made in view of such a situation and is directed to providing a technique that allows a single mobile device to communicate with a plurality of on-board devices in a wireless communication system for a vehicle that executes communication between an on-board device mounted in a vehicle and a mobile device.

To solve the problem described above, a wireless communication system for a vehicle according to an aspect of the present disclosure includes an on-board device and a mobile device. The on-board device is mountable in a vehicle and has an input unit and an output unit. The output unit is capable of outputting an instruction instructing the vehicle to at least unlock the vehicle. The mobile device is capable of wireless communication with the on-board device and has an operation unit. The mobile device holds a first value of first identification information and a first value of second identification information. Upon the operation unit receiving a predetermined operation, the mobile device transmits a first signal having the first value of the first identification information to the on-board device with the use of the wireless communication. Upon the on-board device receiving the first value of the first identification information, the output unit of the on-board device outputs an instruction instructing the vehicle to unlock the vehicle on the basis of the first value of the first identification information. The on-board device holds a second value of at least the second identification information. Upon the input unit receiving a predetermined input, the on-board device transmits a second signal having the second value of at least the second identification information to the mobile device with the use of the wireless communication. Upon receiving the second value of the second identification information, the mobile device transmits a third signal to the on-board device with the use of the wireless communication on the basis of the first value and the second value of the second identification information. Upon the on-board device receiving the third signal, the output unit of the on-board device outputs the instruction instructing the vehicle to unlock the vehicle on the basis of the third signal. At least the first identification information has a value different for each of the mobile device. The first identification information and the second identification information are different from each other. The mobile device transmits a fourth signal having the first value of the second identification information to the on-board device. Upon receiving the fourth signal, the on-board device changes the second identification information held therein to the first value.

Another aspect of the present disclosure provides an identification information registration method. This method includes an on-board device and a mobile device. The on-board device is mountable in a vehicle and has an input unit and an output unit. The output unit is capable of outputting an instruction instructing the vehicle to at least unlock the vehicle. The mobile device is capable of wireless communication with the on-board device and has an operation unit. The mobile device holds a first value of first identification information and a first value of second identification information. Upon the operation unit receiving a predetermined operation, the mobile device transmits a first signal having the first value of the first identification information to the on-board device with the use of the wireless communication. Upon the on-board device receiving the first value of the first identification information, the output unit of the on-board device outputs an instruction instructing the vehicle to unlock the vehicle on the basis of the first value of the first identification information. The on-board device holds a second value of at least the second identification information. Upon the input unit receiving a predetermined input, the on-board device transmits a second signal having the second value of at least the second identification information to the mobile device with the use of the wireless communication. Upon receiving the second value of the second identification information, the mobile device transmits a third signal to the on-board device with the use of the wireless communication on the basis of the first value and the second value of the second identification information. Upon the on-board device receiving the third signal, the output unit of the on-board device outputs the instruction instructing the vehicle to unlock the vehicle on the basis of the third signal. At least the first identification information has a value different for each of the mobile device. The first identification information and the second identification information are different from each other. The mobile device transmits a fourth signal having the first value of the second identification information to the on-board device. Upon receiving the fourth signal, the on-board device changes the second identification information held therein to the first value.

It is to be noted that any optional combinations of the above constituent elements or an embodiment obtained by transforming what is expressed by the present disclosure among a method, an apparatus, a system, a recording medium, a computer program, and so on is also effective as an embodiment of the present disclosure.

BRIEF DESCRIPTION OF THE DRAWINGS

FIG. 4 illustrates an overview of registration processing in the wireless communication system for a vehicle illustrated in FIG. 3;

FIGS. 5A and 5B illustrate a format of a mobile device search signal and a format of a response signal illustrated in FIG. 4;

FIGS. 6A and 6B illustrate a format of an information request signal and a format of a response signal illustrated in FIG. 4;

FIGS. 7A and 7B illustrate a format of a write instruction signal and a format of a response signal illustrated in FIG. 4; and FIG. 8 is a sequence diagram illustrating a registration procedure in the wireless communication system for a vehicle illustrated in FIG. 4.

DETAILED DESCRIPTION

Figure 1A:
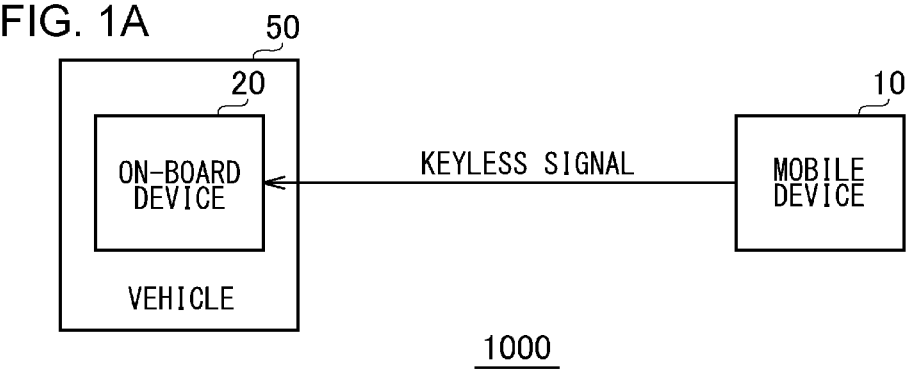
FIGS. 1A and 1B illustrate an overview of keyless communication in a wireless communication system for a vehicle according to an embodiment.

The invention will now be described by reference to the preferred embodiments. This does not intend to limit the scope of the present invention, but to exemplify the invention.

Prior to describing the present disclosure in concrete terms, an overview will be given. Embodiments of the present disclosure relate to a wireless communication system for a vehicle that executes wireless communication between an on-board device mounted in a vehicle and a mobile device (electronic key) carried by a user for locking or unlocking a vehicle door lock. Two types of communication sequences are defined in the wireless communication system for a vehicle that executes wireless communication between the on-board device and the mobile device. In a first type of communication sequence, two-way communication is executed between the on-board device and the mobile device, and this is referred to as "smart communication." In a second type of communication sequence, one-way communication from the mobile device to the on-board device is executed, and this is referred to as "keyless communication." In the smart communication, identification information is used to register a combination of a mobile device and an on-board device. One example of the identification information is the vehicle ID that is used in the related art. As in the related art, when different vehicle IDs for different on-board devices are written into respective mobile devices from the on-board devices, each mobile device can be used only for a corresponding vehicle. In consideration of the user-friendliness, it is preferable that one mobile device can be used for a plurality of vehicles.

In order to allow one mobile device to be used for a plurality of vehicles, in the present embodiments, common identification information (hereinafter, referred to as a "group ID (group identification information") is assigned to each of a plurality of on-board devices. In order to assign such a group ID, the following processing is executed. A group ID is pre-assigned to a first mobile device. The first mobile device has its group ID registered into a first on-board device that has not yet had the group ID registered therein. The first mobile device also has its group ID registered into a second on-board device that is different from the first on-board device and that has not yet had the group ID registered therein. This operation causes the first mobile device, the first on-board device, and the second on-board device to share the same group ID, and thus the first mobile device can execute smart communication with the first on-board device and with the second on-board device.

In such a situation, when a second mobile device is to be registered into the first on-board device and the second on-board device each having the group ID registered therein, the first on-board device has its group ID registered into the second mobile device. Here, the second mobile device has another group ID assigned thereto that is different from the group ID assigned to the first mobile device, but this other group ID is overwritten with the group ID assigned to the first mobile device in accordance with an instruction from the first mobile device. The second on-board device has its group ID registered into the second mobile device. This operation causes the first mobile device, the second mobile device, the first on-board device, and the second on-board device to share the same group ID.

Figure 1B:
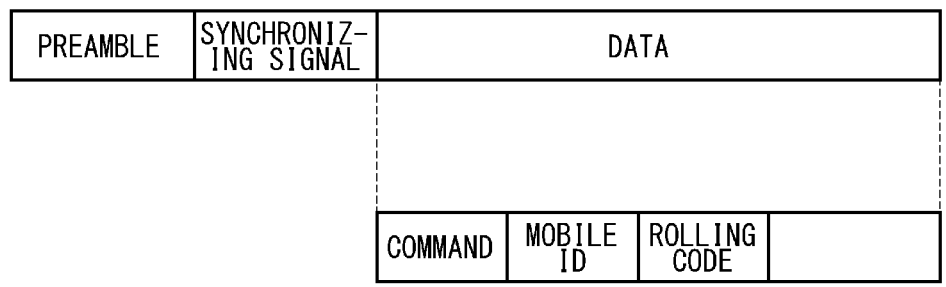

FIGS. 1A and 1B illustrate an overview of keyless communication in a wireless communication system 1000 for a vehicle. The wireless communication system 1000 for a vehicle includes a mobile device 10 and an on-board device 20. The on-board device 20 is mounted in a vehicle 50. The mobile device 10 holds a mobile ID and a group ID. The mobile ID is an ID for identifying the mobile device 10 in keyless communication. Each mobile device 10 has a different value for the mobile ID. The group ID is an ID used in smart communication, which will be described later. The mobile ID and the group ID differ from each other. When the mobile ID is referred to as first identification information, the group ID is referred to as second identification information. For example, the mobile ID held in the mobile device 10 takes a first value, and the group ID takes a first value. These first values may be different values. When an operation unit has received a predetermined operation—for example, when the operation unit has received a user operation for unlocking a door lock, the mobile device 10 transmits a keyless signal to the on-board device 20. For the user operation for unlocking the door lock, the user presses down a button (not illustrated) provided in the mobile device 10, for example. The keyless signal may be referred to as a first signal.

FIG. 1B illustrates a format of a keyless signal. In the keyless signal, a preamble, a synchronizing signal, and data are arrayed in sequence. The preamble and the synchronizing signal are identical to those in a response signal. The data includes a command, a mobile ID, and a rolling code. The command indicates information for identifying a function to be executed through the keyless communication—for example, information for identifying an instruction instructing to unlock a door lock. The mobile ID has the first value, for example. The rolling code indicates a value that is increased with each instance of keyless signal transmission from the mobile device 10. The rolling code is expressed in two bytes, for example. Specifically, the value of the rolling code is incremented by "1" with each instance of keyless signal transmission. Reference is made back to FIG. 1A.

The on-board device 20 receives a keyless signal. On the basis of the mobile ID and the rolling code included in the keyless signal, the on-board device 20 determines whether to unlock the door lock of the vehicle 50. If the on-board device 20 has determined to unlock the door lock, an output unit of the on-board device 20 outputs an instruction instructing the vehicle 50 to unlock the door lock. For locking the door lock of the vehicle 50, similar processing is carried out mainly with only a change in the content of the command.

Figure 2A:
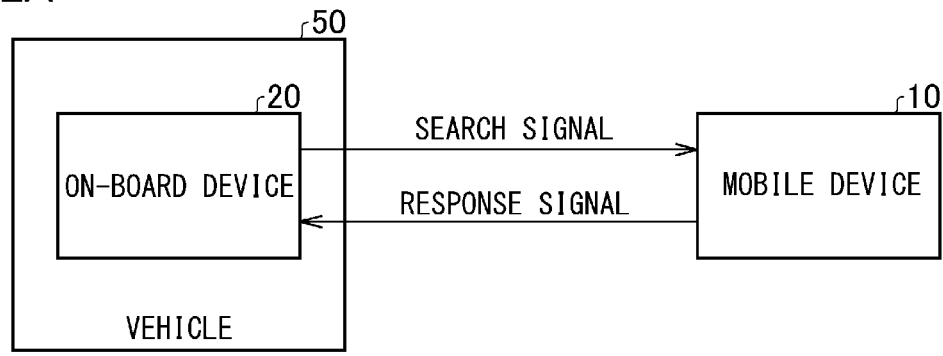
FIGS. 2A to 2C illustrate an overview of smart communication in a wireless communication system for a vehicle according to an embodiment.
Figure 2B:
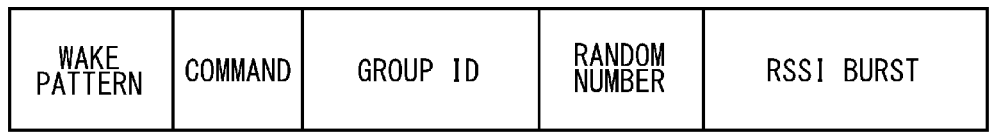
Figure 2C:

FIGS. 2A to 2C illustrate an overview of smart communication in the wireless communication system 1000 for a vehicle. The smart communication is also referred to as a smart entry system, a smart key system, or a passive keyless entry (PKE) system. FIG. 2A illustrates a locking operation in the wireless communication system 1000 for a vehicle. When getting off the vehicle 50, the user stops the engine or the motor of the vehicle 50, opens the door, and closes the door upon getting off the vehicle 50. An input unit of the on-board device 20 receives, as a predetermined input, a series of operations including stopping of the engine or the motor of the vehicle 50, opening of the door, and closing of the door. The predetermined input may include pulling of a door handle. Triggered by the input unit's reception of the predetermined input, the on-board device 20 transmits a search signal to the mobile device 10. The search signal is a low-frequency (LF) signal—for example, a signal in a 125 kHz band. The communication distance of an LF signal is limited to a range of approximately 2 meters from the vehicle 50.

FIG. 2B illustrates a format of a search signal. In the search signal, a wake pattern, a command, a group ID, a random number, and a received signal strength indicator (RSSI) burst are arrayed in sequence. The wake pattern is a signal that causes the mobile device 10 to detect search signal reception. The wake pattern is a signal of a pattern known to the mobile device 10. The command indicates a function to be executed through the smart communication—for example, a function for instructing to lock the door lock. The command is ciphered. The group ID is an ID for identifying a group in which the on-board device 20 is included. The group ID is held in the on-board device 20. The RSSI burst is a signal that causes the mobile device 10 to measure the strength of a received signal. Reference is made back to FIG. 2A.

Upon receiving the search signal from the on-board device 20, the mobile device 10 extracts the group ID from the search signal. On the basis of the extracted group ID, the mobile device 10 determines whether the received search signal is from a proper on-board device 20. For example, the search signal is determined to be from a proper on-board device 20 when the value of the extracted group ID matches the value of the group ID held in the mobile device 10. When the mobile device 10 has recognized that the received search signal is from a proper on-board device 20, the mobile device 10 deciphers the content of the command and measures the reception strength—for example, the RSSI—of the search signal received by the mobile device 10. Thereafter, the mobile device 10 transmits a response signal to the on-board device 20. The response signal is an ultrahigh-frequency (UHF) signal—for example, a signal in a 300 MHz band, the same frequency band as a keyless signal. A UHF signal is also referred to as an RF signal. When the search signal is referred to as a second signal, the keyless signal may be referred to as a third signal. Meanwhile, when the mobile device 10 has recognized that the received search signal is not from a proper on-board device 20, the mobile device 10 may refrain from transmitting any signal or may transmit a signal indicating that the received search signal is not from a proper on-board device 20.

FIG. 2C illustrates a format of a response signal. In the response signal, a preamble, a sequence ID, a ciphertext, an RSSI value, and a cyclic redundancy check (CRC) are arrayed in sequence. The preamble is a known signal used to establish communication (smart communication) between the mobile device 10 and the on-board device 20. The sequence ID is an ID that indicates the order of the mobile device 10 registered in the on-board device 20. The ciphertext is information for indicating that the response signal is a signal corresponding to the command. The RSSI value indicates the reception strength of the search signal measured in the mobile device 10. The CRC is an error correcting code. Well-known technology may be used for the above, and thus descriptions thereof will be omitted herein. Reference is made back to FIG. 2A.

The on-board device 20 receives the response signal from the mobile device 10. If it is determined that the on-board device 20 has received a response to the transmitted search signal from the mobile device 10 on the basis of the sequence ID and the ciphertext included in the response signal, the output unit of the on-board device 20 outputs an instruction instructing the vehicle 50 to lock the door lock. Similar processing may be executed when the door lock is to be unlocked.

Figure 3:
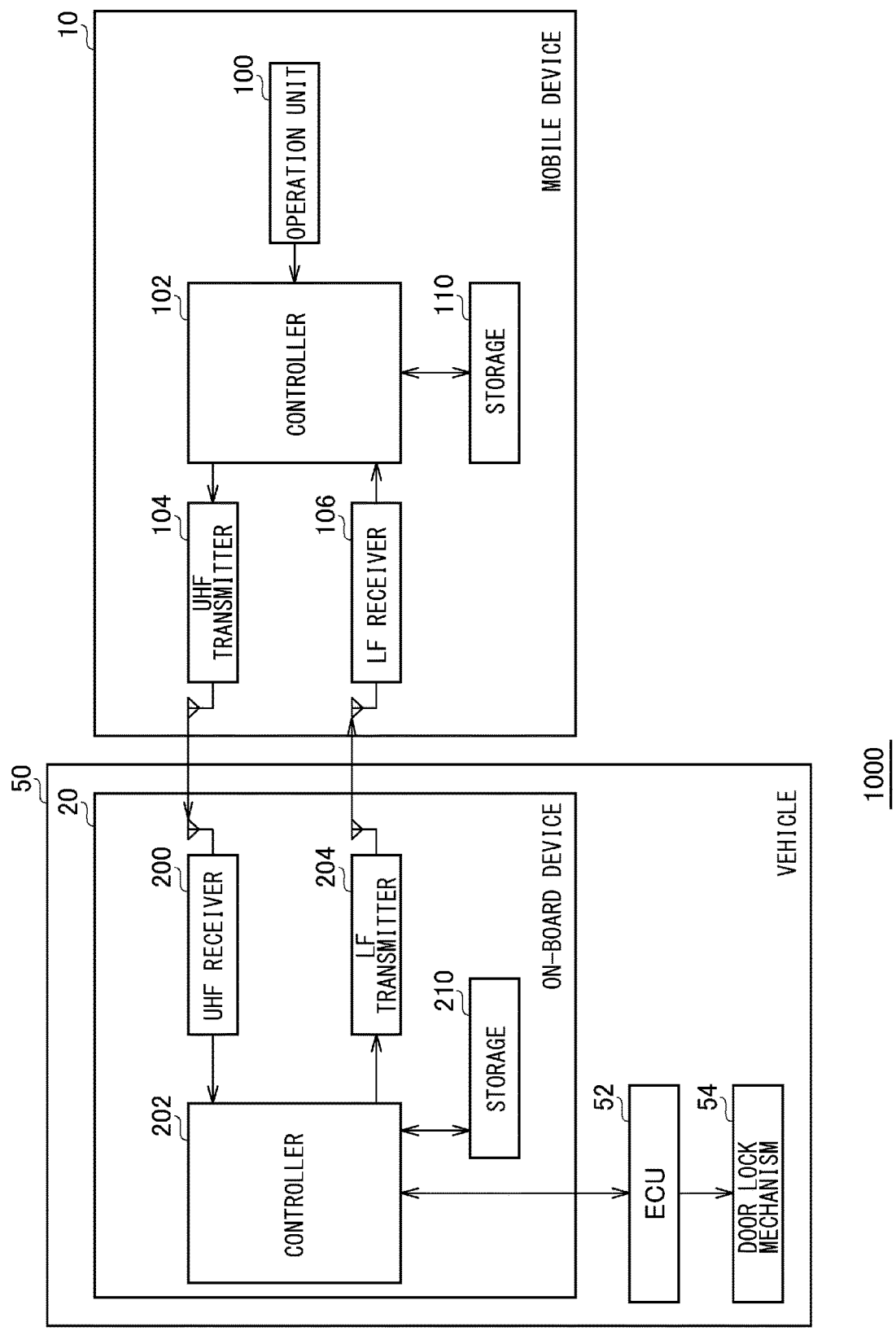
FIG. 3 illustrates a configuration of a wireless communication system for a vehicle according to an embodiment.

FIG. 3 illustrates a configuration of the wireless communication system 1000 for a vehicle. As described above, the wireless communication system 1000 for a vehicle includes the mobile device 10 and the on-board device 20. The on-board device 20 is mounted in the vehicle 50. The mobile device 10 includes an operation unit 100, a controller 102, a UHF transmitter 104, an LF receiver 106, and a storage 110. The on-board device 20 includes a UHF receiver 200, a controller 202, an LF transmitter 204, and a storage 210. The vehicle 50 includes an electronic controller (ECU) 52 and a door lock mechanism 54.

A series of operations including stopping of the engine or the motor of the vehicle 50, opening of the door, and closing of the door is detected with a sensor (not illustrated) mounted in the vehicle 50. Upon being notified of detection of these operations by the sensor, the ECU 52 outputs the detection of the operations to the controller 202. Upon receiving the detection of the operations from the ECU 52, the controller 202 determines to transmit a search signal in smart communication. The controller 202 generates a search signal. At this point, the controller 202 incorporates a group ID stored in the storage 210 into the search signal. The storage 210 also holds an ECU ID. The ECU ID has a value different for each on-board device 20 and is different from the group ID. The ECU ID may be referred to as third identification information. The third identification information may be regarded as identification information (ID) defined for each vehicle 50 or may be regarded as a serial number of each ECU (identification information of each ECU). The controller 202 outputs the search signal to the LF transmitter 204. The LF transmitter 204 transmits the search signal to the mobile device 10.

The LF receiver 106 of the mobile device 10 receives the search signal from the on-board device 20. The LF receiver 106 outputs the search signal to the controller 102. The controller 102 extracts the group ID included in the search signal. On the basis of the group ID stored in the storage 110 and the extracted group ID, the controller 102 executes pair authentication. Well-known technology may be used in the pair authentication, and thus descriptions thereof will be omitted herein. When the pair authentication fails, the processing described below is not executed. Meanwhile, when the pair authentication is successful, the controller 102 generates a response signal. At this point, the controller 102 incorporates a sequence ID stored in the storage 110 into the response signal and also incorporates the RSSI value of the search signal measured in the LF receiver 106 into the response signal. The controller 102 outputs the response signal to the UHF transmitter 104. The UHF transmitter 104 transmits the response signal to the on-board device 20. This operation corresponds to transmission of a response signal to the on-board device 20 in response to a search signal received from the on-board device 20.

The UHF receiver 200 of the on-board device 20 receives the response signal from the mobile device 10. If the UHF receiver 200 fails to receive the response signal within a predetermined duration since the LF transmitter 204 has transmitted the search signal, the controller 202 may cause the LF transmitter 204 to retransmit the search signal. The UHF receiver 200 outputs the response signal to the controller 202. On the basis of the sequence ID and a ciphertext included in the response signal, the controller 202 recognizes that the controller 202 has received a response to the transmitted search signal from the mobile device 10. Thereafter, the controller 202 determines to lock the door lock of the vehicle 50. At this point, the RSSI value included in the response signal may be used to determine whether to lock the door lock of the vehicle 50. Well-known technology may be used in the above, and thus descriptions thereof will be omitted herein. When the controller 202 has determined to lock the door lock, the controller 202 locks the door lock mechanism 54 via the ECU 52. The operation unit 100 of the mobile device 10 is used in keyless communication, but descriptions thereof will be omitted herein.

The above configuration can be implemented in hardware, such as a central processing unit (CPU) of a desired computer, a memory, or other large-scale integration (LSI), or in software, such as a program loaded on a memory. The configuration is depicted herein in the form of functional blocks implemented through cooperation of hardware and software. It is to be understood by a person skilled in the art that these functional blocks can be implemented in various forms solely through hardware or through a combination of hardware and software.

As described thus far, when authentication carried out with the group ID in the on-board device 20 and the group ID in the mobile device 10 is successful, smart communication for locking or unlocking the door lock is established. In the following example, the group ID in the on-board device 20 and the group ID in the mobile device 10 are identical. In such a situation, when the group IDs in the respective on-board devices 20 are identical to the group ID in one mobile device 10, the door locks of a plurality of vehicles 50 mounted with the respective on-board devices 20 can be locked or unlocked with the one mobile device 10. Hereinafter, registration processing for making the group IDs in the respective on-board devices 20 identical to the group ID in one mobile device 10 will be described.

FIG. 4 illustrates an overview of the registration processing of the wireless communication system 1000 for a vehicle. The wireless communication system 1000 for a vehicle includes a first mobile device 10a and a second mobile device 10b, which are collectively referred to as mobile devices 10; and a first on-board device 20a and a second on-board device 20b, which are collectively referred to as on-board devices 20. Neither the number of the mobile devices 10 nor the number of the on-board devices 20 is limited to "2." In FIG. 4, illustration of vehicles 50 in which the on-board devices 20 are mounted is omitted. The registration processing is carried out typically as the first mobile device 10a and the first on-board device 20a are brought into a vehicle manufacturing plant or a vehicle dealer.

A tester (not illustrated) for registration is connected to the first on-board device 20a, and the registration processing starts upon being triggered by an operation on the tester for registration. This applies similarly to the second mobile device 10b and the second on-board device 20b. When the registration processing is started, none of the first mobile device 10a, the second mobile device 10b, a third mobile device 10c, and a fourth mobile device 10d is registered. Therefore, different group IDs are prestored in the first mobile device 10a and the second mobile device 10b, and no group ID is stored in the first on-board device 20a or the second on-board device 20b. Hereinafter, (1) the registration processing between the first mobile device 10a and the first on-board device 20a, (2) the registration processing between the second mobile device 10b and the first on-board device 20a, (3) the registration processing between the first mobile device 10a and the second on-board device 20b, and (4) the registration processing between the second mobile device 10b and the second on-board device 20b will be described in sequence. Reference is also made to FIG. 3 along with the description.

(1) The Registration Processing Between the First Mobile Device 10a and the First On-Board Device 20a The controller 202 of the first on-board device 20a starts the registration processing and transmits, via the LF transmitter 204, a mobile device search signal similar to the search signal described above. FIGS. 5A and 5B illustrate a format of the mobile device search signal and a format of a response signal. As illustrated in FIG. 5A, in the mobile device search signal, awake pattern for registration and a command are arrayed in sequence. The wake pattern for registration is a signal that causes the mobile device 10 to detect mobile device search signal reception. The wake pattern for registration is a signal of a pattern known to the mobile device 10. The wake pattern for registration differs from the wake pattern. In the command, a mobile device search is indicated. FIG. 5B will be described later, and reference is made back to FIG. 4.

The controller 102 of the first mobile device 10a receives the mobile device search signal via the LF receiver 106. On the basis of the command extracted from the mobile device search signal, the controller 102 recognizes that the received signal is for a device search. The controller 102 extracts a sequence ID and a group ID [#1] prestored in the storage 110 and generates a response signal that includes the sequence ID and the group ID [#1], as illustrated in FIG. 5B. Herein, "1" is set in the sequence ID. The controller 102 transmits the response signal to the first on-board device 20a via the UHF transmitter 104. This response signal may be referred to as a fourth signal.

The controller 202 of the first on-board device 20a receives the response signal via the UHF receiver 200. Herein, since the first on-board device 20a has not been registered, a group ID with a value indicating that the first on-board device 20a has not been registered is stored in the storage 210. Since the first on-board device 20a has not been registered, the controller 202 stores the group ID [#1] included in the response signal into the storage 210 and thus changes the group ID with a value indicating that the first on-board device 20a has not been registered to the group ID [#1]. This group ID is illustrated in FIG. 4. The controller 202 checks the sequence ID stored in the storage 210, but since the first on-board device 20a has not been registered, the sequence ID is not stored in the storage 210. Therefore, the controller 202 acquires the sequence ID "1" included in the response signal and stores this sequence ID "1" into the storage 210.

Thereafter, the controller 202 transmits an information request signal via the LF transmitter 204. FIGS. 6A and 6B illustrate a format of the information request signal and a format of a response signal. As illustrated in FIG. 6A, in the information request search signal, a wake pattern for registration and a command are arrayed in sequence. In the command, an information request is indicated. FIG. 6B will be described later, and reference is made back to FIG. 4.

The controller 102 of the first mobile device 10a receives the information request signal via the LF receiver 106. On the basis of the command extracted from the information request signal, the controller 102 recognizes that the received signal is for an information request. The controller 102 extracts a mobile ID and a cryptographic key prestored in the storage 110. The controller 102 extracts the registration count stored in the storage 110, but since the first mobile device 10a has not been registered, "0" is set in the registration count indicating the number of registered on-board devices 20. The controller 102 generates a response signal that includes the mobile ID, the cryptographic key, and the registration count, as illustrated in FIG. 6B. The controller 102 transmits the response signal to the first on-board device 20a via the UHF transmitter 104.

The controller 202 of the first on-board device 20a receives the response signal via the UHF receiver 200. The controller 202 stores the mobile ID and the cryptographic key included in the response signal into the storage 210. The mobile ID and the cryptographic key are indicated as MOBILE ID (FIRST MOBILE DEVICE) and CRYPTOGRAPHIC KEY (FIRST MOBILE DEVICE) in FIG. 4. The controller 202 extracts the registration count included in the response signal and increments the registration count by "1." This brings the registration count to "1." The controller 202 stores the incremented registration count into the storage 210.

Thereafter, the controller 202 acquires the sequence ID, the group ID, and the registration count stored in the storage 210. The controller 202 generates a write instruction signal including the sequence ID, the group ID, and the registration count. FIGS. 7A and 7B illustrate a format of the write instruction signal and a format of a response signal. As illustrated in FIG. 7A, in the write instruction signal, a wake pattern for registration, a command, a sequence ID, a group ID, and a registration count are arrayed in sequence. In the command, a write instruction request is indicated. FIG. 7B will be described later, and reference is made back to FIG. 4. The controller 202 transmits the write instruction signal via the LF transmitter 204.

The controller 102 of the first mobile device 10a receives the write instruction signal via the LF receiver 106. On the basis of the command extracted from the write instruction signal, the controller 102 recognizes that the received signal is for a write instruction. The controller 102 stores the sequence ID, the group ID, and the registration count included in the write instruction signal into the storage 110. The group ID to be stored here is identical to the prestored group ID, and thus no change is made to the group ID. Therefore, it is possible to say that the group ID pre-assigned to the first mobile device 10a is used between the first mobile device 10a and the first on-board device 20a. This description on the group ID applies similarly to the sequence ID. Meanwhile, the registration count to be stored is greater than the prestored registration count by "1," and thus it is possible to say that the incremented registration count is registered into the storage 110. When the above processing is finished, the controller 102 generates a response signal, as illustrated in FIG. 7B. The response signal includes an ACK. The controller 102 transmits the response signal to the first on-board device 20a via the UHF transmitter 104.

The controller 202 of the first on-board device 20a receives the response signal via the UHF receiver 200. On the basis of the ACK included in the response signal, the controller 202 recognizes that the registration in the first mobile device 10a is completed and completes the registration in the first on-board device 20a.

(2) The Registration Processing Between the Second Mobile Device 10b and the First On-Board Device 20a The registration processing is executed between the second mobile device 10b and the first on-board device 20a in a similar manner to that between the first mobile device 10a and the first on-board device 20a. When there is a predetermined input through a self-diagnostic function (on-board diagnostics (OBD)), the controller 202 of the first on-board device 20a starts the registration processing and transmits a mobile device search signal via the LF transmitter 204. The controller 102 of the second mobile device 10b receives the mobile device search signal via the LF receiver 106. The controller 102 extracts a sequence ID and a group ID prestored in the storage 110 and generates a response signal that includes the sequence ID and the group ID, as illustrated in FIG. 5B. In this case as well, "1" is set in the sequence ID. In the group ID, another group ID in the second mobile device 10b that is different from the group ID in the first mobile device 10a is set. In other words, each mobile device 10 holds the value of the group ID in the storage 110 in an overwritable manner. Herein, the value of the group ID held originally has an initial value, and the initial value is a value different for each mobile device 10. The controller 102 transmits a response signal to the first on-board device 20a via the UHF transmitter 104.

The controller 202 of the first on-board device 20a receives the response signal via the UHF receiver 200. Since the group ID is already stored in the storage 210, the controller 202 discards the group ID included in the response signal. In addition, the controller 202 confirms that the sequence ID "1" is already stored in the storage 210. Thus, the controller 202 changes the sequence ID "1" included in the response signal to "2" and stores the sequence ID "2" into the storage 210. Thereafter, the controller 202 transmits an information request signal via the LF transmitter 204.

The controller 102 of the second mobile device 10b receives the information request signal via the LF receiver 106. The controller 102 extracts the registration count stored in the storage 110, but since the second mobile device 10b has not been registered, "0" is set in the registration count. The controller 102 transmits a response signal including a mobile ID, a cryptographic key, and the registration count to the first on-board device 20a via the UHF transmitter 104, as illustrated in FIG. 6B.

The controller 202 of the first on-board device 20a receives the response signal via the UHF receiver 200. The controller 202 stores the mobile ID and the cryptographic key included in the response signal into the storage 210. The mobile ID and the cryptographic key are indicated as MOBILE ID (SECOND MOBILE DEVICE) and CRYPTOGRAPHIC KEY (SECOND MOBILE DEVICE) in FIG. 4. The controller 202 extracts the registration count included in the response signal and increments the registration count by "1." This brings the registration count to "1." The controller 202 stores the incremented registration count into the storage 210. As illustrated in FIG. 4, a set of the mobile ID, the cryptographic key, the sequence ID, and the registration count for the first mobile device 10*a* is stored separately from a set of the mobile ID, the cryptographic key, the sequence ID, and the registration count for the second mobile device 10*b*.

Thereafter, the controller 202 acquires the sequence ID, the group ID, and the registration count stored in the storage 210. This group ID is the group ID [#1] assigned to the first mobile device 10*a*. The controller 202 transmits a write instruction signal including the sequence ID, the group ID, and the registration count via the LF transmitter 204. The write instruction signal may be referred to as a fifth signal.

The controller 102 of the second mobile device 10*b* receives the write instruction signal via the LF receiver 106. The controller 102 stores the sequence ID, the group ID [#1], and the registration count included in the write instruction signal into the storage 110. In other words, the controller 102 changes the group ID prestored in the storage 110 to the group ID [#1]. Therefore, it is possible to say that the second mobile device 10*b* registers the group ID received from the first on-board device 20*a*, replacing the prestored other group ID. Consequently, the group ID pre-assigned to the first mobile device 10*a* is used among the first mobile device 10*a*, the second mobile device 10*b*, and the first on-board device 20*a*. The incremented registration count is also registered in the storage 110. When the above processing is finished, the controller 102 transmits a response signal to the first on-board device 20*a* via the UHF transmitter 104.

(3) The Registration Processing Between the First Mobile Device 10*a* and the Second On-Board Device 20*b*

The registration processing similar to those described above is executed between the first mobile device 10*a* and the second on-board device 20*b*. The controller 202 of the second on-board device 20*b* starts the registration processing and transmits a mobile device search signal via the LF transmitter 204. The controller 102 of the first mobile device 10*a* receives the mobile device search signal via the LF receiver 106. The controller 102 extracts a sequence ID and a group ID stored in the storage 110 and generates a response signal that includes the sequence ID and the group ID, as illustrated in FIG. 5B. In this case as well, "1" is set in the sequence ID. The controller 102 transmits the response signal to the second on-board device 20*b* via the UHF transmitter 104.

The controller 202 of the second on-board device 20*b* receives the response signal via the UHF receiver 200. Since the second on-board device 20*b* has not been registered, the controller 202 stores the group ID included in the response signal into the storage 210 and thus registers this group ID. This group ID is denoted as GROUP ID [#1] in FIG. 4. In this manner, the number of on-board devices 20 that can hold the group ID of one mobile device 10 is not limited to "1" and can be "2 or more." The controller 202 checks the sequence ID stored in the storage 210, but since the second on-board device 20*b* has not been registered, the sequence ID is not stored in the storage 210. Therefore, the controller 202 acquires the sequence ID "1" included in the response signal and stores this sequence ID "1" into the storage 210. Thereafter, the controller 202 transmits an information request signal via the LF transmitter 204.

The controller 102 of the first mobile device 10*a* receives the information request signal via the LF receiver 106. The controller 102 extracts a mobile ID and a cryptographic key prestored in the storage 110. In addition, the controller 102 extracts the registration count "1" stored in the storage 110. The controller 102 transmits a response signal including the mobile ID, the cryptographic key, and the registration count to the second on-board device 20*b* via the UHF transmitter 104.

The controller 202 of the second on-board device 20*b* receives the response signal via the UHF receiver 200. The controller 202 stores the mobile ID and the cryptographic key included in the response signal into the storage 210. The mobile ID and the cryptographic key are indicated as MOBILE ID (FIRST MOBILE DEVICE) and CRYPTOGRAPHIC KEY (FIRST MOBILE DEVICE) in FIG. 4. The controller 202 extracts the registration count included in the response signal and increments the registration count by "1." This brings the registration count to "2." The controller 202 stores the further incremented registration count into the storage 210.

Thereafter, the controller 202 acquires the sequence ID, the group ID, and the registration count stored in the storage 210. The controller 202 transmits a write instruction signal including the sequence ID, the group ID, and the registration count via the LF transmitter 204.

The controller 102 of the first mobile device 10*a* receives the write instruction signal via the LF receiver 106. The controller 102 stores the sequence ID, the group ID, and the registration count included in the write instruction signal into the storage 110. The group ID to be stored here is identical to the prestored group ID, and thus no change is made to the group ID. Therefore, it is possible to say that the group ID pre-assigned to the first mobile device 10*a* is used between the first mobile device 10*a* and the second on-board device 20*b*. This description on the group ID applies similarly to the sequence ID. Meanwhile, the registration count to be stored is greater than the prestored registration count by "1," and thus the incremented registration count is registered into the storage 110. When the above processing is finished, the controller 102 transmits a response signal to the second on-board device 20*b* via the UHF transmitter 104.

(4) The Registration Processing Between the Second Mobile Device 10*b* and the Second On-Board Device 20*b*

The registration processing is executed between the second mobile device 10*b* and the second on-board device 20*b* in a similar manner to that between the second mobile device 10*b* and the first on-board device 20*a*. The controller 202 of the second on-board device 20*b* starts the registration processing and transmits a mobile device search signal via the LF transmitter 204. The controller 102 of the second mobile device 10*b* receives the mobile device search signal via the LF receiver 106. The controller 102 extracts a sequence ID and a group ID stored in the storage 110 and generates a response signal that includes the sequence ID and the group ID, as illustrated in FIG. 5B. In this case as well, "1" is set in the sequence ID. The group ID is identical to the group ID in the first mobile device 10*a*. The controller 102 transmits the response signal to the second on-board device 20*b* via the UHF transmitter 104.

The controller 202 of the second on-board device 20*b* receives the response signal via the UHF receiver 200. Since the group ID is already stored in the storage 210, the controller 202 discards the group ID included in the response signal. In addition, the controller 202 confirms that the sequence ID "1" is already stored in the storage 210. Therefore, the controller 202 changes the sequence ID "1" included in the response signal to "2" and stores the sequence ID "2" into the storage 210. Thereafter, the controller 202 transmits an information request signal via the LF transmitter 204.

The controller 102 of the second mobile device 10b receives the information request signal via the LF receiver 106. In addition, the controller 102 extracts the registration count "1" stored in the storage 110. The controller 102 transmits a response signal including a mobile ID, a cryptographic key, and the registration count to the second on-board device 20b via the UHF transmitter 104.

The controller 202 of the second on-board device 20b receives the response signal via the UHF receiver 200. The controller 202 stores the mobile ID and the cryptographic key included in the response signal into the storage 210. The mobile ID and the cryptographic key are indicated as MOBILE ID (SECOND MOBILE DEVICE) and CRYPTOGRAPHIC KEY (SECOND MOBILE DEVICE) in FIG. 4. The controller 202 extracts the registration count included in the response signal and increments the registration count by "1." This brings the registration count to "2." The controller 202 stores the further incremented registration count into the storage 210. As illustrated in FIG. 4, a set of the mobile ID, the cryptographic key, the sequence ID, and the registration count for the first mobile device 10a is stored separately from a set of the mobile ID, the cryptographic key, the sequence ID, and the registration count for the second mobile device 10b.

Thereafter, the controller 202 acquires the sequence ID, the group ID, and the registration count stored in the storage 210. The controller 202 transmits a write instruction signal including the sequence ID, the group ID, and the registration count via the LF transmitter 204.

The controller 102 of the second mobile device 10b receives the write instruction signal via the LF receiver 106. The controller 102 stores the sequence ID, the group ID, and the registration count included in the write instruction signal into the storage 110. Consequently, the group ID preassigned to the first mobile device 10a is used among the first mobile device 10a, the second mobile device 10b, the first on-board device 20a, and the second on-board device 20b. The incremented registration count is also registered in the storage 110. When the above processing is finished, the controller 102 transmits a response signal to the second on-board device 20b via the UHF transmitter 104.

An operation of the wireless communication system 1000 for a vehicle configured as described above will be described. FIG. 8 is a sequence diagram illustrating a registration procedure in the wireless communication system 1000 for a vehicle. The first on-board device 20a transmits a mobile device search signal for searching the first mobile device 10a (step S10). The first mobile device 10a transmits a response signal (step S12). The first on-board device 20a registers a group ID included in the response signal (step S14). The first on-board device 20a transmits an information request signal (step S16). The first mobile device 10a transmits a response signal (step S18). The first on-board device 20a stores information included in the response signal (step S20). The first on-board device 20a transmits a write instruction signal (step S22). The first mobile device 10a transmits a response signal (step S24). The first mobile device 10a stores information included in the write instruction signal (step S26).

The first on-board device 20a transmits a mobile device search signal for searching the second mobile device 10b (step S28). The second mobile device 10b transmits a response signal (step S30). The first on-board device 20a transmits an information request signal (step S32). The second mobile device 10b transmits a response signal (step S34). The first on-board device 20a stores information included in the response signal (step S36). The first on-board device 20a transmits a write instruction signal (step S38). The second mobile device 10b transmits a response signal (step S40). The second mobile device 10b stores information included in the write instruction signal (step S42).

The second on-board device 20b transmits a mobile device search signal for searching the first mobile device 10a (step S44). The first mobile device 10a transmits a response signal (step S46). The second on-board device 20b registers a group ID included in the response signal (step S48). The second on-board device 20b transmits an information request signal (step S50). The first mobile device 10a transmits a response signal (step S52). The second on-board device 20b stores information included in the response signal (step S54). The second on-board device 20b transmits a write instruction signal (step S56). The first mobile device 10a transmits a response signal (step S58). The first mobile device 10a stores information included in the write instruction signal (step S60).

The second on-board device 20b transmits a mobile device search signal for searching the second mobile device 10b (step S62). The second mobile device 10b transmits a response signal (step S64). The second on-board device 20b transmits an information request signal (step S66). The second mobile device 10b transmits a response signal (step S68). The second on-board device 20b stores information included in the response signal (step S70). The second on-board device 20b transmits a write instruction signal (step S72). The second mobile device 10b transmits a response signal (step S74). The second mobile device 10b stores information included in the write instruction signal (step S76).

According to the present embodiment, a group ID is registered into the first on-board device and the second on-board device from the first mobile device. This allows the first on-board device, the second on-board device, and the first mobile device to share the same group ID. Since the first on-board device, the second on-board device, and the first mobile device share the same group ID, the singe mobile device can communicate with the plurality of on-board devices. Since the single mobile device can communicate with the plurality of on-board devices, this configuration renders it unnecessary to carry a plurality of mobile devices. Since it becomes unnecessary to carry a plurality of mobile devices, the user-friendliness can be improved.

Since the registration count is incremented in accordance with the number of on-board devices in which the first mobile device is registered, each on-board device can be identified in the first mobile device. Since the first on-board device having the group ID registered therein registers the group ID into the second mobile device, this configuration allows the second mobile device to use the same group ID. Since the group ID is registered into the second mobile device to replace another group ID prestored in the second mobile device, this configuration allows the second mobile device to use the same group ID. Since the registration count is incremented in accordance with the number of on-board devices in which the second mobile device is registered, each on-board device can be identified in the second mobile device.

Since an on-board device makes the value of its group ID match that of a mobile device, a single mobile device can communicate with a plurality of on-board devices. Since an ECU ID having a value different for each on-board device differs from a group ID, communication can be executed regardless of the ECU ID. Since a group ID has a value indicating that the group ID has not been registered, an unregistered state can be changed to a registered state. Since a second mobile device makes the value of the group ID held therein match the group ID of a first mobile device, the first mobile device and the second mobile device can share the same value of the group ID. Since a mobile device holds the value of a group ID in an overwritable manner, the value of the group ID can be changed. Since the value of a group ID has an initial value different for each mobile device, each mobile device can be identified even the group ID is in its initial value.

An overview of an embodiment of the present disclosure is as follows. A wireless communication system for a vehicle according to an aspect of the present disclosure includes an on-board device and a mobile device. The on-board device is mountable in a vehicle and has an input unit and an output unit. The output unit is capable of outputting an instruction instructing the vehicle to at least unlock the vehicle. The mobile device is capable of wireless communication with the on-board device and has an operation unit. The mobile device holds a first value of first identification information and a first value of second identification information. Upon the operation unit receiving a predetermined operation, the mobile device transmits a first signal having the first value of the first identification information to the on-board device with the use of the wireless communication. Upon the on-board device receiving the first value of the first identification information, the output unit of the on-board device outputs an instruction instructing the vehicle to unlock the vehicle on the basis of the first value of the first identification information. The on-board device holds a second value of at least the second identification information. Upon the input unit receiving a predetermined input, the on-board device transmits a second signal having the second value of at least the second identification information to the mobile device with the use of the wireless communication. Upon receiving the second value of the second identification information, the mobile device transmits a third signal to the on-board device with the use of the wireless communication on the basis of the first value and the second value of the second identification information. Upon the on-board device receiving the third signal, the output unit of the on-board device outputs the instruction instructing the vehicle to unlock the vehicle on the basis of the third signal. At least the first identification information has a value different for each of the mobile device. The first identification information and the second identification information are different from each other. The mobile device transmits a fourth signal having the first value of the second identification information to the on-board device. Upon receiving the fourth signal, the on-board device changes the second identification information held therein to the first value.

According to this aspect, the on-board device makes a value of the second identification information match that of the mobile device, and thus a single mobile device can communicate with a plurality of on-board devices.

In the wireless communication system for a vehicle, the on-board device may hold third identification information having a value different for each of the on-board device, and the third identification information may be different from the second identification information. In this case, since the third identification information having a value different for each on-board device is different from the second identification information, communication can be executed regardless of the third identification information.

In the wireless communication system for a vehicle, the second value of the second identification information may indicate that the second identification information has not been registered. In this case, since the second value of the second identification information indicates that the second identification information has not been registered, an unregistered state can be changed to a registered state.

In the wireless communication system for a vehicle, with the mobile device serving as a first mobile device, the wireless communication system may further include a second mobile device capable of wireless communication with the on-board device. Upon a predetermined input being received in the on-board device, the on-board device may transmit a fifth signal having the first value of the second identification information held in the on-board device to the second mobile device. Upon receiving the first value of the second identification information, the second mobile device may change a value of the second identification information held in the second mobile device to the first value. In this case, since the second mobile device changes the value of the second identification information held in the second mobile device to the first value, the first mobile device and the second mobile device can share the same value of the second identification information.

In the wireless communication system for a vehicle, the mobile device may hold a value of the second identification information in an overwritable manner. In this case, since the mobile device holds the value of the second identification information in an overwritable manner, the value of the second identification information can be changed.

In the wireless communication system for a vehicle, a value of the second identification information held by the mobile device may have an initial value. The initial value may be a value different for each mobile device. In this case, since the second identification information has an initial value different for each mobile device, each mobile device can be identified even in a state of having an initial value.

Another aspect of the present disclosure provides an identification information registration method. This method includes an on-board device and a mobile device. The on-board device is mountable in a vehicle and has an input unit and an output unit. The output unit is capable of outputting an instruction instructing the vehicle to at least unlock the vehicle. The mobile device is capable of wireless communication with the on-board device and has an operation unit. The mobile device holds a first value of first identification information and a first value of second identification information. Upon the operation unit receiving a predetermined operation, the mobile device transmits a first signal having the first value of the first identification information to the on-board device with the use of the wireless communication. Upon the on-board device receiving the first value of the first identification information, the output unit of the on-board device outputs an instruction instructing the vehicle to unlock the vehicle on the basis of the first value of the first identification information. The on-board device holds a second value of at least the second identification information. Upon the input unit receiving a predetermined input, the on-board device transmits a second signal having the second value of at least the second identification information to the mobile device with the use of the wireless communication. Upon receiving the second value of the second identification information, the mobile device transmits a third signal to the on-board device with the use of the wireless communication on the basis of the first value and the second value of the second identification information. Upon the on-board device receiving the third signal, the output unit of the on-board device outputs the instruction instructing the vehicle to unlock the vehicle on the basis of the third signal. At least the first identification information has a value different for each of the mobile device. The first identification information and the second identification information are different from each other. The mobile device transmits a fourth signal having the first value of the second identification information to the on-board device. Upon receiving the fourth signal, the on-board device changes the second identification information held therein to the first value.

According to this aspect, the on-board device makes a value of the second identification information match that of the mobile device, and thus a single mobile device can communicate with a plurality of on-board devices.

In the identification information registration method, the on-board device may hold third identification information having a value different for each of the on-board device, and the third identification information may be different from the second identification information. In this case, since the third identification information having a value different for each on-board device is different from the second identification information, communication can be executed regardless of the third identification information.

In the identification information registration method, the second value of the second identification information may indicate that the second identification information has not been registered. In this case, since the second value of the second identification information indicates that the second identification information has not been registered, an unregistered state can be changed to a registered state.

In the identification information registration method, with the mobile device serving as a first mobile device, the wireless communication system may further include a second mobile device capable of wireless communication with the on-board device. Upon a predetermined input being received in the on-board device, the on-board device may transmit a fifth signal having the first value of the second identification information held in the on-board device to the second mobile device. Upon receiving the first value of the second identification information, the second mobile device may change a value of the second identification information held in the second mobile device to the first value. In this case, since the second mobile device changes the value of the second identification information held in the second mobile device to the first value, the first mobile device and the second mobile device can share the same value of the second identification information.

In the identification information registration method, the mobile device may hold a value of the second identification information in an overwritable manner. In this case, since the mobile device holds the value of the second identification information in an overwritable manner, the value of the second identification information can be changed.

In the identification information registration method, a value of the second identification information held by the mobile device may have an initial value. The initial value may be a value different for each mobile device. In this case, since the second identification information has an initial value different for each mobile device, each mobile device can be identified even in a state of having an initial value.

Thus far, the present disclosure has been described on the basis of some embodiments. These embodiments are illustrative in nature, and it should be appreciated by a person skilled in the art that various modifications can be made to the combinations of the components and that such modifications also fall within the scope of the present disclosure.

In an embodiment of the present disclosure, the first on-board device 20a and the second on-board device 20b can communicate with the first mobile device 10a. This, however, is not a limiting example, and the first on-board device 20a may communicate only with the last second on-board device 20b to have been registered and may be prohibited from communicating with the first on-board device 20a, for example. Specifically, in smart communication, the first mobile device 10a rotates a ciphertext to the right by the registration count value, and the on-board device 20 rotates a ciphertext to the left by the registration count value. The ciphertext is restored to the original ciphertext in the last second on-board device 20b to have been registered, and this makes communication possible. The ciphertext is not restored to the original ciphertext in the first on-board device 20a registered prior to the last one, and thus communication is not enabled. When the registration count is transmitted during communication and the registration count matches in the mobile device 10 and the on-board device 20, the communication may be carried out. The present modification can provide communication with improved flexibility.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-058929, filed on Mar. 26, 2018, and Japanese Patent Application No. 2019-030415, filed on Feb. 22, 2019, the entire contents of which are incorporated herein by reference.

What is claimed is:

1. A wireless communication system for a vehicle, the wireless communication system comprising:
    an on-board device mountable in a vehicle, the on-board device having an input unit and an output unit, the output unit being configured to output an instruction instructing the vehicle to at least unlock the vehicle; and
    a mobile device configured for wireless communication with the on-board device, the mobile device having an operation unit,
    the mobile device holding a first value of first identification information and a first value of second identification information,
    upon the operation unit receiving a predetermined operation, the mobile device transmitting a first signal having the first value of the first identification information to the on-board device with the use of the wireless communication,
    upon the on-board device receiving the first value of the first identification information, the output unit of the on-board device outputting an instruction instructing the vehicle to unlock the vehicle on the basis of the first value of the first identification information,
    the on-board device holding a second value of at least the second identification information,
    upon the input unit receiving a predetermined input, the on-board device transmitting a second signal having the second value of at least the second identification information to the mobile device with the use of the wireless communication,
    upon receiving the second value of the second identification information, the mobile device transmitting a third signal to the on-board device with the use of the wireless communication on the basis of the first value and the second value of the second identification information, upon the on-board device receiving the third signal, the output unit of the on-board device outputting the instruction instructing the vehicle to unlock the vehicle on the basis of the third signal, at least the first identification information having a value different for each of the mobile device, the first identification information and the second identification information being different from each other, the mobile device transmitting a fourth signal having the first value of the second identification information to the on-board device, upon receiving the fourth signal, the on-board device changing the second identification information held therein to the first value.

2. The wireless communication system for a vehicle according to claim 1, wherein
the on-board device holds third identification information having a value different for each of the on-board device, and
the third identification information is different from the second identification information.

3. The wireless communication system for a vehicle according to claim 1, wherein
the second value of the second identification information indicates that the second identification information has not been registered.

4. The wireless communication system for a vehicle according to claim 2, wherein
the second value of the second identification information indicates that the second identification information has not been registered.

5. The wireless communication system for a vehicle according to claim 1, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

6. The wireless communication system for a vehicle according to claim 2, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

7. The wireless communication system for a vehicle according to claim 3, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

8. The wireless communication system for a vehicle according to claim 4, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

9. The wireless communication system for a vehicle according to claim 1, wherein
the mobile device holds a value of the second identification information in an overwritable manner.

10. The wireless communication system for a vehicle according to claim 1, wherein
a value of the second identification information held by the mobile device has an initial value, and
the initial value is a value different for each of the mobile device.

11. An identification information registration method that can be used in a wireless communication system for a vehicle, the wireless communication system comprising:
an on-board device that is mountable in a vehicle, the on-board device having an input unit and an output unit, the output unit being configured to output an instruction instructing the vehicle to at least unlock the vehicle; and
a mobile device configured for wireless communication with the on-board device, the mobile device having an operation unit,
the mobile device holding a first value of first identification information and a first value of second identification information,
upon the operation unit receiving a predetermined operation, the mobile device transmitting a first signal having the first value of the first identification information to the on-board device with the use of the wireless communication,
upon the on-board device receiving the first value of the first identification information, the output unit of the on-board device outputting an instruction instructing the vehicle to unlock the vehicle on the basis of the first value of the first identification information,
the on-board device holding a second value of at least the second identification information,
upon the input unit receiving a predetermined input, the on-board device transmitting a second signal having the second value of at least the second identification information to the mobile device with the use of the wireless communication, upon receiving the second value of the second identification information, the mobile device transmitting a third signal to the on-board device with the use of the wireless communication on the basis of the first value and the second value of the second identification information, upon the on-board device receiving the third signal, the output unit of the on-board device outputting the instruction instructing the vehicle to unlock the vehicle on the basis of the third signal, at least the first identification information having a value different for each of the mobile device, the first identification information and the second identification information being different from each other, the mobile device transmitting a fourth signal having the first value of the second identification information to the on-board device, upon receiving the fourth signal, the on-board device changing the second identification information held therein to the first value.

12. The identification information registration method according to claim 11, wherein
the on-board device holds third identification information having a value different for each of the on-board device, and
the third identification information is different from the second identification information.

13. The identification information registration method according to claim 11, wherein
the second value of the second identification information indicates that the second identification information has not been registered.

14. The identification information registration method according to claim 12, wherein
the second value of the second identification information indicates that the second identification information has not been registered.

15. The identification information registration method according to claim 11, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

16. The identification information registration method according to claim 12, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

17. The identification information registration method according to claim 13, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

18. The identification information registration method according to claim 14, wherein
with the mobile device serving as a first mobile device,
the wireless communication system further includes a second mobile device configured for wireless communication with the on-board device, wherein
upon a predetermined input being received in the on-board device, the on-board device transmits a fifth signal having the first value of the second identification information held in the on-board device to the second mobile device, and
upon receiving the first value of the second identification information, the second mobile device changes a value of the second identification information held in the second mobile device to the first value.

19. The identification information registration method according to claim 11, wherein
the mobile device holds a value of the second identification information in an overwritable manner.

20. The identification information registration method according to claim 11, wherein
a value of the second identification information held by the mobile device has an initial value, and
the initial value is a value different for each of the mobile device.

* * * * *